July 27, 1926.
J. W. MILLER
CLUTCH
Filed Nov. 13, 1923
1,594,105
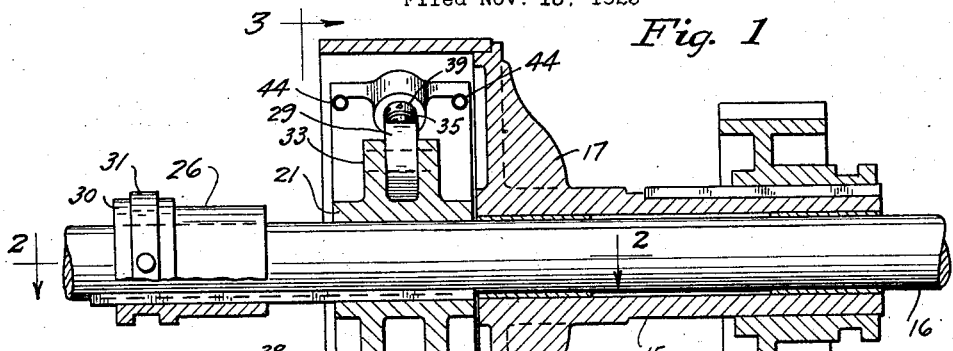
Fig. 1
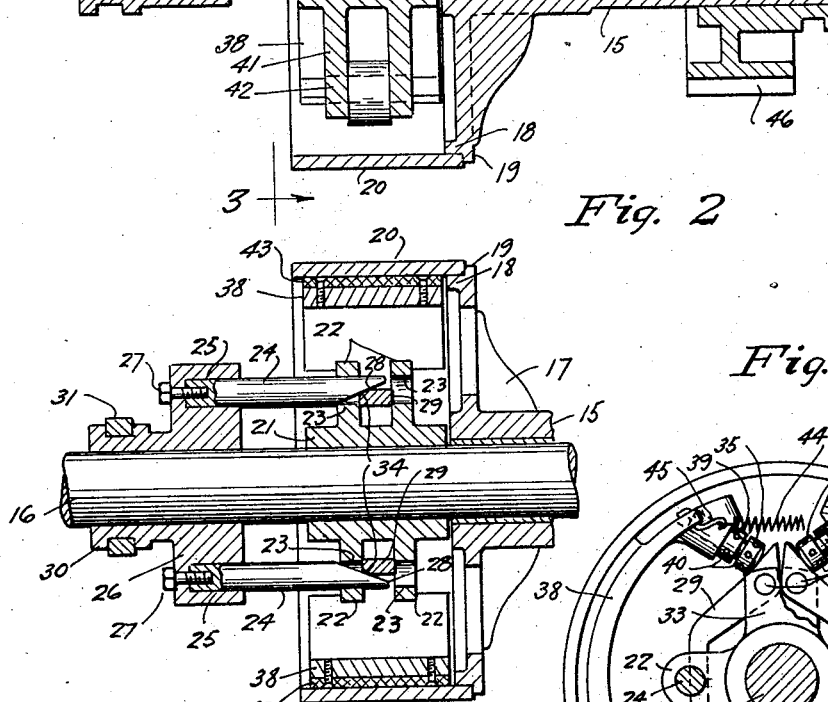
Fig. 2
Fig. 3
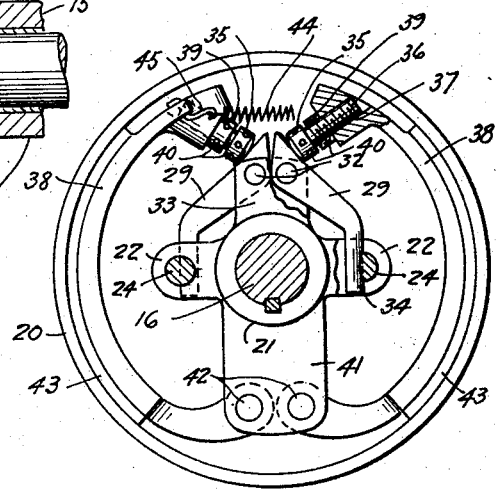
INVENTOR.
John W. Miller
BY Munn &Co.
ATTORNEYS Patented July 27, 1926.

1,594,105

UNITED STATES PATENT OFFICE.

JOHN W. MILLER, OF PASADENA, CALIFORNIA.

CLUTCH.

Application filed November 13, 1923. Serial No. 674,561.

My invention relates to clutches of the internal expanding type, and a purpose of my invention is the provision of a clutch particularly adapted, although not necessarily, for use in well drilling apparatus, and which is structurally simple, yet sufficiently durable to withstand heavy duty.

It is also a purpose of my invention to provide an internally expanding clutch in which the expanding means is positive in operation and capable of adjustment to compensate for wear of the liners so that an effective clutching action can be secured at all times.

I will describe only one form of clutch embodying my invention and will then point out the novel features thereof in claims.

In the accompanying drawings

Figure 1 is a view showing in vertical section one form of clutch embodying my invention in applied position upon a shaft;

Figure 2 is a horizontal sectional view taken on the line 2—2 of Figure 1; and

Figure 3 is a vertical sectional view taken on the line 3—3 of Figure 1.

Referring specifically to the drawings, in which similar reference characters refer to similar parts, my invention in its present embodiment comprises a body including a sleeve or tubular member 15 loosely mounted on a shaft 16, and provided at one end with a spider 17 for supporting an annulus 18 having a radially extending annular flange 19. A drum 20 is supported at one edge upon the annulus 18 and in abutting relation to the flange 19, the drum being secured to the annulus and flange, preferably by welding.

Disposed within the drum 20 and keyed or otherwise fixed to the shaft 16 is a hub member 21 provided with integrally formed guiding ears 22, such ears being arranged in pairs at diametrically opposed points, and the ears of each pair being formed with alined openings 23 for slidably receiving rods 24. The rods 24 are detachably secured within the sockets 25 of a collar 26 by means of screw bolts 27, and the free ends of the rods are tapered to form wedges 28 adapted to actuate levers 29. The collar 26 is formed with a grooved extension 30 in which is seated a ring 31 adapted to be pivotally mounted for moving the extension and collar longitudinally upon the shaft 16.

As clearly shown in Figure 3, the levers 29 are of the bell crank type and are pivoted at points indicated at 32 upon an extension 33 of the hub member 21. The lower ends of the levers 29 are disposed between the pairs of ears 22 and are formed with rounded edges 34 adapted to be engaged by the wedges 28. The upper ends of the levers are tapered and constantly engage the heads 35 of connecting members including shanks 36 which are threaded in bosses or sockets 37 formed on the upper ends of shoes 38. Lock nuts 39 are mounted on the shanks 36 for securing the connecting members in any adjusted position within the sockets, and the nuts and heads are formed at intervals with openings 40 to permit the application of suitable tools thereto in effecting rotation of the nuts and heads.

The shoes 38 are of substantially semicircular form and have their lower ends curved inwardly and pivoted upon a depending arm 41 formed in the hub 21, the pivot points of the shoes being indicated at 42. These shoes carry liners 43 which are adapted to engage the inner periphery of the drum 20, but are normally maintained out of engagement with the drum by means of coiled contractile springs 44 connected to the upper ends of the shoes by means of hooks 45 and acting to contract the shoes, as will be understood.

In operation, the rods 24 are normally retracted so as to allow the levers 29 to occupy a normal position wherein the springs 44 yieldably maintain the shoes and consequently the liners out of contact with the inner periphery of the drum. As the clutch body is loosely mounted upon the shaft 16, it will be clear that when the shoes are out of engagement with the drum no operative connection is provided between the hub member 21 and the drum 20. However, when the collar 26 is moved toward the drum, the wedge members 28 of the rods 24 engage the lower ends of the lever 29, thereby actuating the same to move their upper ends outwardly against the heads 35 of the connecting members and thereby forcing the shoes outwardly to cause the liners to engage the inner periphery of the drum 20, thus operatively connecting the clutch drum with the hub member so that rotation of the shaft 16 will be imparted to the drum.

In Figure 1 I have shown a gear 46 slidably keyed upon the sleeve 15 so as to rotate therewith whereby, when the clutch drum is operatively connected to the hub member, rotation of the gear 46 is effected, yet permitting of a longitudinal adjustment of the gear upon the sleeve.

Upon retraction of the collar 26 so as to withdraw the wedges 28 out of engagement with the levers 29, the springs 44 operate to contract the shoes 38 to normal position, thereby moving the liners 43 out of engagement with the drum 20 and thereby disconnecting the clutch drum from the hub member. By an adjustment of the connecting members within the sockets 37, it will be manifest that the wear of the liners 43 can be compensated for so as to insure the proper gripping of the liners with the drum at all times.

Although I have shown and described only one form of clutch embodying my invention, it is to be understood that various changes and modifications may be made herewithin without departing from the spirit of the invention and the spirit and scope of the appended claims.

What I claim is:

1. An internally expanding clutch comprising a body including an annulus and a drum secured to the annulus, a hub member adapted to be fixed to a shaft, guide ears on the hub member, an extension on the hub member, levers pivoted on the extension, said levers having one of their ends tapered and the other disposed between said guide ears, liner-carrying shoes pivoted on the hub member, sockets on the shoes, shanks threaded in the sockets and having heads engaging the tapered ends of the levers, yieldable members for urging the shoes toward each other to maintain the shanks in engagement with the levers, a collar adapted for movement longitudinally on said shaft, and wedges carried by the collar and movable in said ears to actuate said levers whereby said shoes can be expanded against the action of the yieldable members to cause the liners to engage said drum.

2. An internally expanding clutch comprising a body including an annulus and a drum secured to the annulus, a hub member adapted to be fixed to a shaft, guide ears on the hub member, an extension on the hub member, levers pivoted on the extension, said levers having one of their ends tapered and the other disposed between said guide ears, liner carrying shoes pivoted on the hub member, sockets on the shoes, shanks threaded in the sockets and having heads engaging the tapered ends of the levers, yieldable members for urging the shoes toward each other to maintain the shanks in engagement with the levers, a collar adapted for movement longitudinally on the said shaft, and rods removably secured in the collar and having wedges formed on the ends thereof, said rods being movable in said ears to cause the wedges to engage the levers for the purpose described.

3. A clutch comprising a hub member, guiding ears on the hub member arranged in pairs, with the ears of each pair formed with registering openings, a collar mounted for movement toward and away from the hub member, rods detachably secured to the collar and having their free ends tapered to provide wedge members, said rods being movable in said openings, an extension on the hub member, levers pivoted on the extension and disposed between said ears, a drum surrounding the hub member, shoes pivoted on the hub member, means normally acting to contract the shoes, and means for actuating the collar to move said wedge members inwardly of the ears for actuating the levers to expand said shoes.

JOHN W. MILLER.